(12) United States Patent
Han et al.

(10) Patent No.: US 12,074,740 B2
(45) Date of Patent: Aug. 27, 2024

(54) DATA INVERSION CIRCUIT TO PERFORM DBI-AC ENCODING USING PAM 4 SIGNAL

(71) Applicant: Industry-University Cooperation Foundation Hanyang University, Seoul (KR)

(72) Inventors: Jaeduk Han, Seoul (KR); Eunji Song, Seoul (KR); SangHun Lee, Seoul (KR); YunSeong Jo, Seoul (KR); HyeongMin Seo, Seoul (KR); Hyuntae Kim, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 17/896,471

(22) Filed: Aug. 26, 2022

(65) Prior Publication Data

US 2023/0071072 A1 Mar. 9, 2023

(30) Foreign Application Priority Data

Aug. 26, 2021 (KR) .................. 10-2021-0112910

(51) Int. Cl.
    *H04L 25/49* (2006.01)
(52) U.S. Cl.
    CPC ................ *H04L 25/4917* (2013.01)
(58) Field of Classification Search
    CPC ... H04B 1/38; H04B 1/40; H04B 3/03; H04B 3/32; H04B 14/023; H04L 25/026; H04L 25/4917; H03K 7/02

(Continued)

(56) References Cited

U.S. PATENT DOCUMENTS

| 8,909,840 B2 * | 12/2014 | Nygren | ............... G06F 13/4273 |
| | | | 710/305 |
| 2007/0038789 A1 * | 2/2007 | Macri | ................... H03L 7/0816 |
| | | | 710/105 |

(Continued)

FOREIGN PATENT DOCUMENTS

| KR | 10-2018-0057028 A | 5/2018 |
| KR | 10-2018-0058478 A | 6/2018 |

*Primary Examiner* — Young T. Tse
(74) *Attorney, Agent, or Firm* — Sughrue Mion, PLLC

(57) ABSTRACT

According to an aspect, a data inversion circuit configured to perform DBI-AC encoding using a PAM 4 signal may comprise a data generation unit configured to generate input data based on the PAM 4 signal, a channel comprising N data lines, a first auxiliary signal generation unit configured to generate a first auxiliary signal that determines whether to perform a first encoding on the input data based on the number of each of a plurality of data symbols included in the input data, a first data encoding unit configured to generate intermediate data by performing the first encoding on the input data based on the first auxiliary signal, a second auxiliary signal generation unit configured to generate a second auxiliary signal that determines whether to perform a third encoding on the intermediate data by analyzing the relationship between a plurality of data symbols at a current time point and a plurality of data symbols at a previous time point included in the intermediate data and a second data encoding unit configured to generate encoded data by performing the third encoding on the intermediate data based on the second auxiliary signal, and to transmit the generated encoded data to a data reception unit via the channel and the first auxiliary signal and the second auxiliary signal may be combined into one signal and implemented as a PAM 4 signal.

7 Claims, 15 Drawing Sheets

(58) Field of Classification Search
USPC ........ 375/219, 220, 242, 257, 268, 288, 353
See application file for complete search history.

(56) References Cited

U.S. PATENT DOCUMENTS

| | | | |
|---|---|---|---|
| 2012/0131244 A1* | 5/2012 | Abbasfar | G06F 13/4265 |
| | | | 710/105 |
| 2015/0212156 A1* | 7/2015 | Bourstein | H04L 1/0042 |
| | | | 714/744 |
| 2019/0079892 A1* | 3/2019 | Jung | G06F 13/4072 |
| 2019/0386677 A1* | 12/2019 | Sudhakaran | H03M 7/46 |
| 2021/0377080 A1* | 12/2021 | Park | H04L 25/14 |

* cited by examiner

| NO | INPUT DATA | REFERENCE VALUES | AUXILIARY SIGNALS | ENCODED DATA |
|---|---|---|---|---|
| 1 | 00 / 00 / 00 / 00 | 12 | 1 | 11 / 11 / 11 / 11 |
| 2 | 00 / 00 / 00 / 01 | 10 | 1 | 11 / 11 / 11 / 10 |
| 3 | 00 / 00 / 00 / 11 | 6 | 1 | 11 / 11 / 11 / 00 |
| 4 | 00 / 00 / 01 / 11 | 5 | 1 | 11 / 11 / 10 / 00 |
| 5 | 00 / 00 / 11 / 11 | 0 | 1 | 11 / 11 / 00 / 00 |
| 6 | 00 / 01 / 11 / 11 | -2 | 0 | 00 / 01 / 11 / 11 |
| 7 | 00 / 11 / 11 / 11 | -6 | 0 | 00 / 11 / 11 / 11 |
| 8 | 01 / 11 / 11 / 11 | -8 | 0 | 01 / 11 / 11 / 11 |
| 9 | 11 / 11 / 11 / 11 | -12 | 0 | 11 / 11 / 11 / 11 |

|  | D[1] | D[2] | D[3] | D[4] | D[5] | D[6] | D[7] | D[8] |
|---|---|---|---|---|---|---|---|---|
| Data [T0] | 0 | 0 | 0 | 0 | 0 | 0 | 0 | 0 |
| Data [T1] | 1 | 0 | 1 | 0 | 0 | 0 | 0 | 0 |

Fig. 7(a)

PERFORMING INVERSION ENCODING

|  | INPUT DATA (T1) | INPUT DATA (T0) | STACK VALUES | ENCODED DATA (T1) | STACK VALUES WHEN ENCODED STACK VALUES |
|---|---|---|---|---|---|
| D1 | 11 | 10 | 1 | 01 | 1 |
| D2 | 01 | 11 | 2 | 11 | 0 |
| D3 | 01 | 11 | 2 | 11 | 0 |
| D4 | 11 | 00 | 3 | 01 | 1 |
| SUM | | | 8 > 6 | | 2 |

Fig. 7(b)

|  | INPUT DATA (T1) | INPUT DATA (T0) | STACK VALUES | ENCODED DATA (T1) |
|---|---|---|---|---|
| D1 | 11 | 10 | 1 | 11 |
| D2 | 01 | 01 | 0 | 01 |
| D3 | 01 | 10 | 2 | 01 |
| D4 | 11 | 10 | 1 | 11 |
| SUM | | | 4 < 6 | |

Fig. 9(a)

PERFORMING INVERSION ENCODING

|  | INPUT DATA (T1) | INPUT DATA (T0) | STACK VALUES | ENCODED DATA (T1) | STACK VALUES WHEN ENCODED STACK VALUES |
|---|---|---|---|---|---|
| D1 | 00 | 11 | 3 | 11 | 0 |
| D2 | 11 | 01 | 2 | 00 | 1 |
| D3 | 01 | 10 | 1 | 11 | 1 |
| D4 | 11 | 01 | 2 | 01 | 0 |
| D5 | 01 | 00 | 1 | 11 | 3 |
| D6 | 11 | 01 | 2 | 01 | 0 |
| D7 | 11 | 10 | 1 | 01 | 1 |
| D8 | 01 | 11 | 2 | 11 | 0 |
| SUM |  |  | 14 |  | 6 |

Fig. 9(b)

|  | INPUT DATA (T1) | INPUT DATA (T0) | STACK VALUES | ENCODED DATA (T1) |
|---|---|---|---|---|
| D1 | 00 | 11 | 3 | 00 |
| D2 | 10 | 01 | 1 | 11 |
| D3 | 01 | 00 | 1 | 01 |
| D4 | 11 | 11 | 0 | 11 |
| D5 | 01 | 01 | 0 | 01 |
| D6 | 11 | 11 | 0 | 11 |
| D7 | 11 | 10 | 1 | 11 |
| D8 | 01 | 10 | 1 | 01 |
| SUM |  |  | 7 |  |

Fig. 14

| | INPUT DATA (T1) | INTERMEDIATE DATA (T1) | INPUT DATA (T0) | FIRST STACK VALUES | INTERMEDIATE DATA (T1) | SECOND STACK VALUES | ENCODED DATA |
|---|---|---|---|---|---|---|---|
| D1 | 11 | 00 | 11 | 3 | 11 | 0 | 11 |
| D2 | 00 | 11 | 01 | 2 | 00 | 1 | 00 |
| D3 | 10 | 01 | 01 | 0 | 11 | 2 | 11 |
| D4 | 00 | 11 | 11 | 0 | 01 | 2 | 01 |
| D5 | 10 | 01 | 01 | 0 | 11 | 2 | 11 |
| D6 | 00 | 11 | 01 | 2 | 01 | 0 | 01 |
| D7 | 00 | 11 | 10 | 1 | 01 | 1 | 01 |
| D8 | 10 | 01 | 11 | 2 | 11 | 0 | 11 |
| REFERENCE VALUES | 6 | | | | | | |
| FIRST AUXILIARY SIGNALS | 1 | | | | | | |
| SUM | | | | 10 | | 8 | |
| SECOND AUXILIARY SIGNALS | | | | | | 1 | |

Fig. 15

| INPUT DATA | INPUT DATA ENCODING METHOD | DC power ratio [%] | AC power ratio [%] |
|---|---|---|---|
| PAM4 | FIRST ENCODING | 82.77 | - |
| PAM4 | SECOND ENCODING | 73.83 | - |
| PAM4 | FOURTH ENCODING | 82.70 | 80.60 |

DATA INVERSION CIRCUIT TO PERFORM DBI-AC ENCODING USING PAM 4 SIGNAL

CROSS-REFERENCE TO RELATED APPLICATION

This application claims the benefit of Korean Patent Application No. 10-2021-2021-0112910, filed on Aug. 26, 2021 in the Korean Intellectual Property Office, the disclosure of which is incorporated herein by reference.

FIELD OF THE DISCLOSURE

The present disclosure relates to a data inversion circuit for performing DBI-AC encoding using a PAM 4 signal, and more particularly, to a technique for reducing the power consumption of a circuit while increasing the data transmission speed by designing a DBI encoding method used for transmitting data so as to be applied to a PAM 4 signal as well.

BACKGROUND

For the data transferred between integrated circuit devices, the data are stored in a semiconductor integrated circuit under the control of a central processing unit (CPU) or a graphic processing unit (GPU). Of the factors that influence the performance of a semiconductor integrated circuit, i.e., a main memory or a graphic memory, data processing speed takes up the highest weight.

Data transfer between integrated circuit devices is made in the form of data signals, also known as data bits, driven on parallel channels of a data bus. Data bits can be sensitive to crosstalk, simultaneous switching noise (SSN), inter-symbol interference (ISI), and/or power consumption depending on the state of the data or the frequency of the data transition. In order to reduce these adverse effects, data encoding methods such as data bus inversion (DBI) can be used.

The DBI encoding technique is a technique of inverting and transmitting the current data if the number of data having a high value or a low value out of eight data is four or more, and of transmitting the current data without inverting it, otherwise.

That is, the DBI first assesses the relationship between the data bits to be transmitted to the data bus, and decide whether inverting some or all of the data bits prior to transmission is efficient for transmitting the data. If it is decided to be efficient and the data bits are inverted, an additional signal called the DBI bit indicating that the data bits have been inverted may be set, and when the DBI encoding technique is applied, effects such as reduction of power consumption, improvement of signal integrity (SI), and reduction of heat generation can be expected.

On the other hand, as technology develops, the PAM 4 (four-level pulse amplitude modulation) technique that can transmit a signal of 2 bits instead of 1 bit at a time has been applied in order to enhance the signal transmission efficiency in the field of signal processing that requires high-speed operation such as ultra-high-speed wired/wireless communication ICs, communication units of processing units such as CPU/GPUs, memory-CPU communication units, etc. For PAM 4 signals, data corresponding to 2 bits can be transmitted at a time, unlike the PAM 2 signals that have been conventionally commonly used, and thus, there is an advantage of being able to enhance data transmission speed and transmission efficiency.

However, since the development of the data processing technique using PAM 4 signals is insubstantial until now, the reality is that the data encoding technique capable of enhancing the efficiency of data transmission in transmitting the PAM 4 signals is insignificant.

SUMMARY

Therefore, a data inversion circuit for performing DBI-AC encoding using a PAM 4 signal in accordance with one embodiment is devised to solve the problems described above, and it is an object to provide a technique capable of enhancing the efficiency of data transmission based on PAM 4 signals by efficiently performing data encoding according to the situation in transmitting data using the PAM 4 signals.

More specifically, a data inversion circuit for performing DBI-AC encoding using a PAM 4 signal in accordance with one embodiment has an object of providing a data inversion circuit capable of enhancing the power efficiency of the entire circuit by performing DBI-AC encoding according to a PAM 4 signal by analyzing the pattern of inputted data, or by performing encoding that suppresses the crosstalk phenomenon caused by changes in signal values of adjacent data lines in transmitting data.

According to an aspect, a data inversion circuit configured to perform DBI-AC encoding using a PAM 4 signal may comprise a data generation unit configured to generate input data based on the PAM 4 signal, a channel comprising N data lines, a first auxiliary signal generation unit configured to generate a first auxiliary signal that determines whether to perform a first encoding on the input data based on the number of each of a plurality of data symbols included in the input data, a first data encoding unit configured to generate intermediate data by performing the first encoding on the input data based on the first auxiliary signal, a second auxiliary signal generation unit configured to generate a second auxiliary signal that determines whether to perform a third encoding on the intermediate data by analyzing the relationship between a plurality of data symbols at a current time point and a plurality of data symbols at a previous time point included in the intermediate data and a second data encoding unit configured to generate encoded data by performing the third encoding on the intermediate data based on the second auxiliary signal, and to transmit the generated encoded data to a data reception unit via the channel and the first auxiliary signal and the second auxiliary signal may be combined into one signal and implemented as a PAM 4 signal.

The auxiliary signal generation unit may determine whether to perform encoding on the data based on level difference values between data symbols at the current time point and symbol signals at the previous time point respectively corresponding to the N data lines.

The auxiliary signal generation unit may determine to perform encoding on the input data if a summed stack value of all difference values between symbol signals at the current time point and symbol signals at a next time point respectively corresponding to the N data lines exceeds a preset value, and determines not to perform encoding on the input data if it does not exceed.

The auxiliary signal generation unit may generate the auxiliary signal as an NRZ (non-return to zero) signal and generate an auxiliary signal having a data symbol of 1 if determined to perform encoding on the input data, and may generate an auxiliary signal having a data symbol of 0 if determined not to perform encoding on the input data.

The preset value refers to a half value of a maximum stack value that can occur in the N data lines, and the maximum stack value is determined to be 3×N.

The auxiliary signal generation unit may determine whether to perform encoding on the input data based on a summed value of all of first stack values that are difference values between symbol signals at the current time point and symbol signals at a next time point respectively corresponding to the N data lines and a summed value of all of second stack values that are difference values between the symbol signals at the current time point and the symbol signals at the next time point respectively corresponding to the N data lines on the basis of modulated data obtained by exchanging the data symbol of the current time point inputted to the Nth data line and the data symbol of the current time point inputted to the (N+1)th data line.

The auxiliary signal generation unit may determine to perform encoding on the input data if the summed value of all of first stack values is greater than the summed value of all of second stack values.

The auxiliary signal generation unit may determine not to perform encoding on the input data if the summed value of all of first stack values is less than the summed value of all of second stack values.

The auxiliary signal generation unit may generate the auxiliary signal as an NRZ (non-return to zero) signal, and generate an auxiliary signal having a data symbol of 1 if determined to perform encoding on the input data, and generates an auxiliary signal having a data symbol of 0 if determined not to perform encoding on the input data.

The data encoding unit may generate the encoded data by performing a third encoding of exchanging the data symbol of the current time point inputted to the Nth data line and the data symbol of the current time point inputted to the (N+1)th data line if the auxiliary signal having a data symbol of 1 is received from the auxiliary signal unit.

The data encoding unit may generate the input data as they are as the encoded data if the auxiliary signal having a data symbol of 0 is received from the auxiliary signal unit.

According to another aspect, a data inversion circuit configured to perform DBI-AC encoding using a PAM 4 signal may comprise a data generation unit configured to generate input data based on the PAM 4 signal, a channel comprising N data lines, a first auxiliary signal generation unit configured to generate a first auxiliary signal that determines whether to perform a first encoding on the input data based on the number of each of a plurality of data symbols included in the input data, a first data encoding unit configured to generate intermediate data by performing the first encoding on the input data based on the first auxiliary signal, a second auxiliary signal generation unit configured to generate a second auxiliary signal that determines whether to perform a third encoding on the intermediate data by analyzing the relationship between a plurality of data symbols at a current time point and a plurality of data symbols at a previous time point included in the intermediate data and a second data encoding unit configured to generate encoded data by performing the third encoding on the intermediate data based on the second auxiliary signal, and to transmit the generated encoded data to a data reception unit via the channel.

The first encoding may be encoding of inverting data symbols having the data symbol of 1 to 0 and inverting data symbols having the data symbol of 0 to 1 among the input data.

The second encoding may be encoding of exchanging the data symbol of the current time point inputted to the Nth data line and the data symbol of the current time point inputted to the (N+1)th data line.

According to other aspect, a data inversion circuit configured to perform DBI-AC encoding using a PAM 4 signal may comprise a data generation unit configured to generate input data based on the PAM 4 signal, a channel comprising N data lines, a first auxiliary signal generation unit configured to generate a first auxiliary signal that determines whether to perform a first encoding on the input data based on the number of each of a plurality of data symbols included in the input data, a first data encoding unit configured to generate intermediate data by performing the first encoding on the input data based on the first auxiliary signal, a second auxiliary signal generation unit configured to generate a second auxiliary signal that determines whether to perform a third encoding on the intermediate data by analyzing the relationship between a plurality of data symbols at a current time point and a plurality of data symbols at a previous time point included in the intermediate data and a second data encoding unit configured to generate encoded data by performing the third encoding on the intermediate data based on the second auxiliary signal, and to transmit the generated encoded data to a data reception unit via the channel, the first auxiliary signal and the second auxiliary signal are combined into one signal and implemented as a PAM 4 signal.

Effects of the Invention

The data inversion circuit using a PAM 4 signal in accordance with one embodiment of the present disclosure has an advantage of being able to transmit data more efficiently by performing encoding according to the situation on the inputted data and then transmitting the data in the data transmission method using a PAM 4 signal.

Specifically, the data inversion circuit using a PAM 4 signal in accordance with one embodiment has an advantage of being able to enhance the power consumption efficiency of the entire circuit by reducing power consumption in the driver stage by effectively performing DBI-AC encoding according to the PAM 4 signal.

In addition, there is an advantage of being able to enhance the safety and power efficiency of the entire circuit by reducing the power consumption in the driver stage through DBI-Cross encoding according to the situation and at the same time minimizing the crosstalk phenomenon that may occur through the channel in transmitting data.

The effects of the present disclosure are not limited to the technical objects mentioned above, and other effects that have not been mentioned will be clearly understood by those skilled in the art from the following description.

BRIEF DESCRIPTION OF THE DRAWINGS

FIG. 5 is a diagram showing inputted data, reference values and auxiliary signals according to them, and data encoded according to the type of the auxiliary signals in order to describe a first encoding method in accordance with the present disclosure.

FIGS. 7(a) and 7(b) are figures for describing a reference to which a third encoding method in accordance with one embodiment of the present disclosure is applied.

FIGS. 9(a) and 9(b) are figures for describing a reference on which a third encoding method in accordance with one embodiment of the present disclosure is applied to eight data lines.

FIG. 14 is a table for describing a fourth encoding in accordance with one embodiment of the present disclosure.

FIG. 15 is a table showing changes in power consumption between the case where each encoding method is applied and the case where each encoding method is not applied in order to describe the effect in accordance with the present disclosure.

DETAILED DESCRIPTION OF THE PREFERRED EMBODIMENTS

Figure 1:
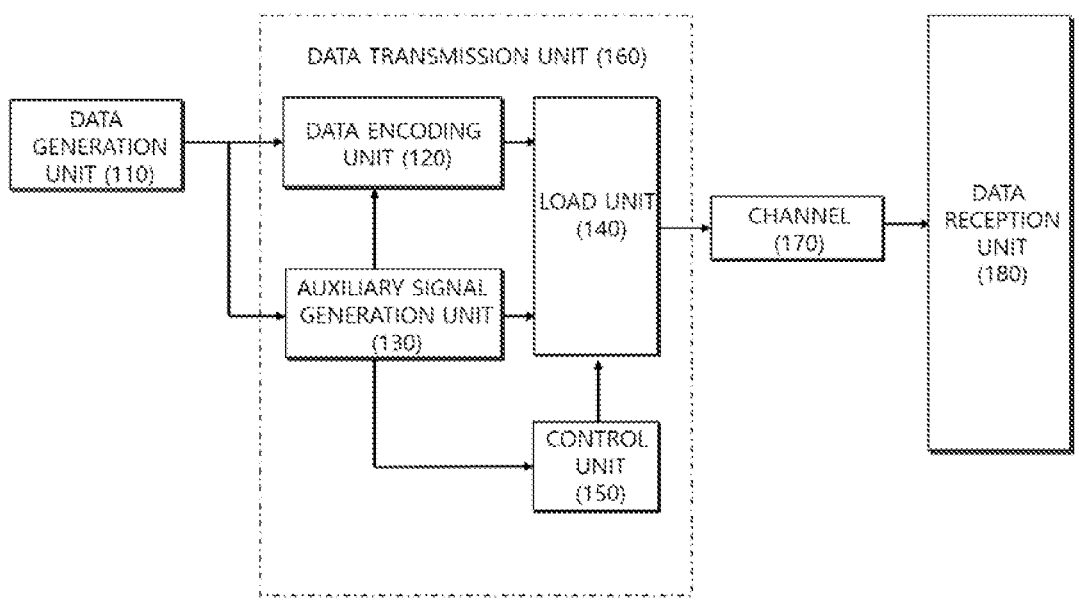
FIG. 1 is a block diagram showing some components of a data inversion circuit 100 in accordance with one embodiment of the present disclosure.

Hereinafter, embodiments according to the present invention will be described with reference to the accompanying drawings. In adding reference numerals to constituent elements of each drawing, it should be noted that the same constituent elements are denoted by the same reference numeral even if they are illustrated on different drawings. In describing the embodiments of the present invention, a detailed description of pertinent known constructions or functions will be omitted if it is deemed to make the gist of the embodiments the present invention unnecessarily vague. In addition, the embodiments of the present invention will be described below, but the technical idea of the present invention is not limited thereto or is not restricted thereto, and may be variously realized by being modified by those skilled in the art.

In addition, terms used in the present specification are used only in order to describe embodiments rather than limiting or restricting the present invention. Singular forms are intended to include plural forms unless the context clearly indicates otherwise.

In the present specification, it should be understood that the term "include", "comprise", or "have" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

In addition, throughout the specification, when it is described that an element is "connected" to another element, this includes not only being "directly connected", but also being "indirectly connected" with another element in between, and terms including ordinal numbers such as first, second, and the like used in the present specification will be used only to describe various elements, and are not to be interpreted as limiting these elements.

The present invention will be described more fully hereinafter with reference to the accompanying drawings, in which embodiments of the invention are shown. In the drawings, parts irrelevant to the description are omitted in order to clearly describe the present invention.

Furthermore, the title of the invention is a method and apparatus for providing a document editing interface for providing resource information related to a document using a backlink button. For convenience of explanation, however, in the specification below, an apparatus for providing a document editing interface for providing resource information associated with a document using a backlink button is referred to as a document editing interface providing apparatus in its description. The meaning of 'clicking' throughout the document is used to refer to the user requesting an execution command for the button, and as a common term, it may refer to executing a command by clicking a mouse or using a specific key on a keyboard in a PC environment, and tapping by a user's touch consecutively or for a certain period of time in a mobile environment.

Hereinafter, embodiments in accordance with the present disclosure will be described in detail with reference to the accompanying drawings, and although the title of the present disclosure is 'Data Inversion Circuit Using PAM 4 Signal', it will be referred to as 'a data inversion circuit' for the convenience of the description below.

Figure 2:
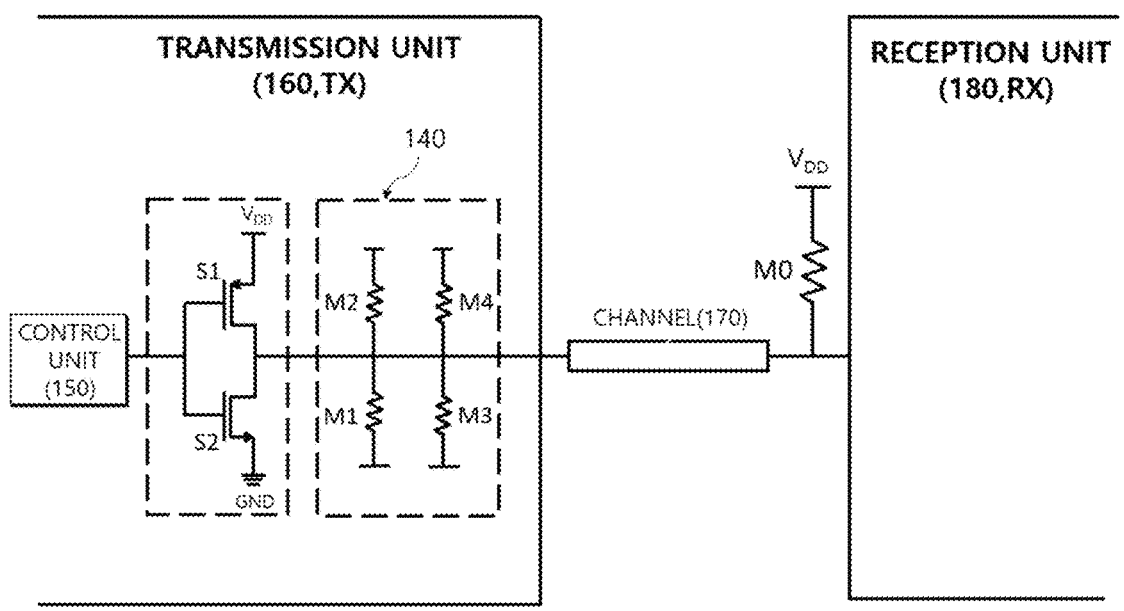
FIG. 2 is a circuit diagram showing some components of a data inversion circuit in accordance with one embodiment of the present disclosure.
Figure 3A:
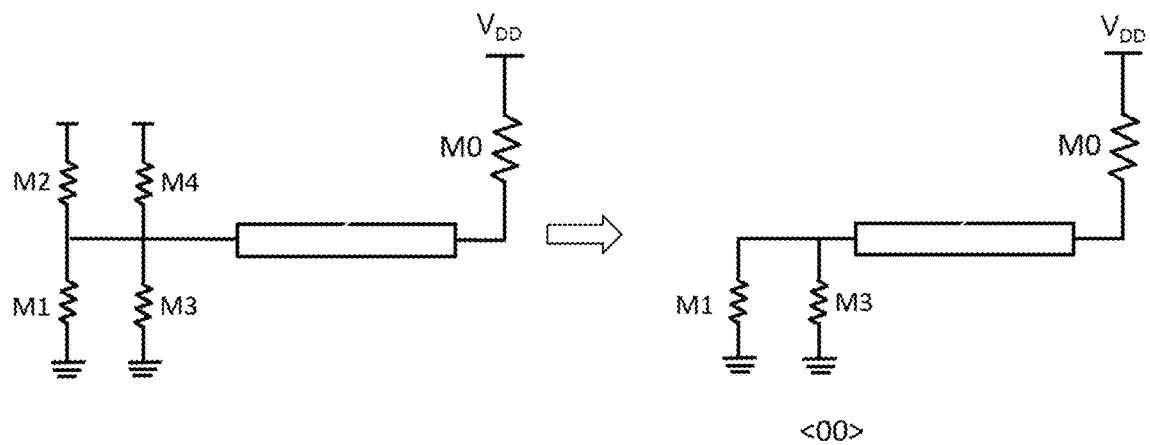
FIGS. 3(a) and 3(b) are diagrams showing a connection form of load elements when a data symbol is 00 or 01 in accordance with one embodiment of the present disclosure.
Figure 3B:
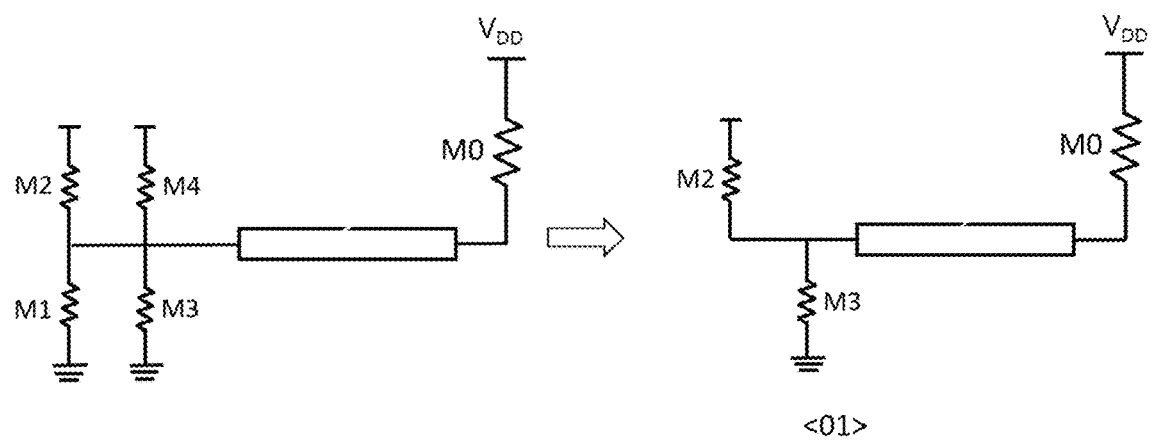
Figure 4A:
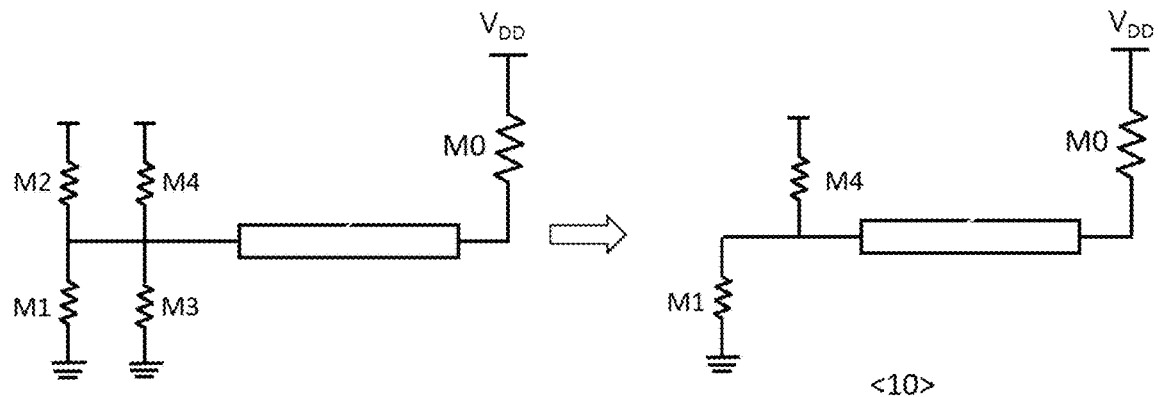
FIGS. 4(a) and 4(b) are diagrams showing a connection form of load elements when a data symbol is 10 or 11 in accordance with one embodiment of the present disclosure.
Figure 4B:
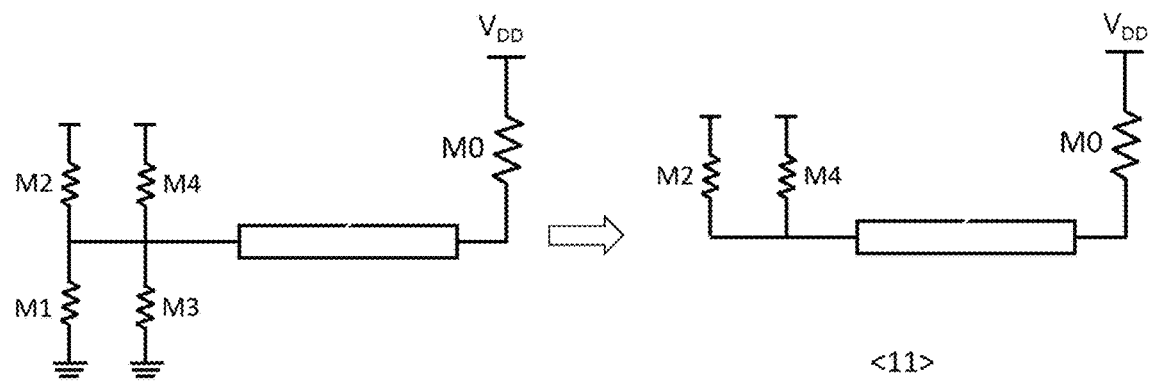

FIG. 1 is a block diagram showing some components of a data inversion circuit 100 in accordance with one embodiment of the present disclosure, and FIG. 2 is a circuit diagram showing some components of a data inversion circuit in accordance with one embodiment of the present disclosure. FIGS. 3(a) and 3(b) is a diagram showing a connection form of load elements when a data symbol is 00 or 01 in accordance with one embodiment of the present disclosure, and FIGS. 4(a) and 4(b) is a diagram showing a connection form of load elements when a data symbol is 10 or 11 in accordance with one embodiment of the present disclosure.

Referring to FIG. 1, the data inversion circuit 100 in accordance with one embodiment may include a data generation unit 110 configured to generate input data, a data transmission unit 160 configured to transmit the generated input data via a channel, a channel 170 including a plurality of data lines as a travel path of data, and a data reception unit 180 configured to receive data via the channel 170, and the data transmission unit 160 may include a data encoding unit 120, an auxiliary signal generation unit 130, and a load unit 140.

The data generation unit 110 is a component configured to generate input data, and the generated input data are transmitted to the data transmission unit 160, and the generated data refer to data that can be transmitted by a PAM 4 signal.

The data transmission unit 160 transmits the data generated by the data generation unit 110 to the data reception unit 180 via the channel 170 using PAM 4 (four-level pulse amplitude modulation) signal.

The PAM 4 signal applied throughout the present disclosure basically refers to a signal that transmits a 2-bit signal instead of a 1-bit signal when transmitting data at a time, unlike PAM 2 signals.

In addition, although the channel 170 is represented by a single component in FIG. 1, this is for the convenience of description and the actual channel 170 includes a plurality of data lines, and the data encoded by the data encoding unit 120 may be transmitted to the data reception unit 180 via the plurality of data lines. As one example, the channel 170 may include four (4) data lines or eight (8) data lines.

The data encoding unit 120 may encode the data generated by the data generation unit 110 based on the auxiliary signal generated by the auxiliary signal generation unit 130 with respect to the input data generated by the data generation unit 110.

What encoding means in the present disclosure generally refers to encoding performed by a data bus inversion circuit. It means that, for example, the current data are inverted and transmitted if more than half of the data to be transmitted has a high value, and otherwise, the current data are transmitted as they are without inversion. In addition, as will be described later, not only the encoding method of simply inverting the data is applied, but also encoding may be performed on the input data by a method of changing the order and inputted position of the inputted data in performing encoding on the input data in the present disclosure. A detailed description thereof will be described later.

As the data encoding method performed by the data encoding unit 120, a DBI (data bus inversion) encoding method may be typically applied, and specifically, a DBI-DC encoding method that allows power consumption to be minimized in a stage before the data passes through a channel by inverting 0s and 1s of the data to be transmitted, and a DBI-AC encoding method for preventing a crosstalk phenomenon that occurs in data lines adjacent thereto due to changes in data symbol values over time in a particular data line may be applied. A first encoding and a second encoding used in the present disclosure to be described later are encodings associated with the DBI-DC encoding, a third encoding is associated with the DBI-AC encoding, and a fourth encoding corresponds to encoding associated with the DBI-DC encoding and the DBI-AC encoding.

Accordingly, the data encoding unit 120 may be referred to as a DBI-DC encoding unit, a DBI-AC encoding unit, or a DBI encoding unit, depending on the way it performs encoding. A detailed description of the encoding method of the data encoding unit 120 DBI-DC method and the DBI-AC method in accordance with the present disclosure will be described later.

The auxiliary signal generation unit 130 may analyze the pattern of the data generated by the data generation unit 110, generate auxiliary information including encoding information to be performed by the data encoding unit 120, and transmit the generated auxiliary information to the data encoding unit 120.

As one example, if the data encoding unit 120 performs DBI encoding on the inputted data, the auxiliary information may be DBI flag information including information on which method of the DBI encoding out of the DBI encoding methods should be performed by the data encoding unit 120.

The auxiliary signal generated by the auxiliary signal generation unit 130 may be implemented with a 1-bit NRZ (non-return-to-zero) signal or a 2-bit PAM 4 signal. Since the NRZ signal is a 1-bit signal, the data symbols are generated only with 0 or 1, but in the case of the PAM 4 signal, a total of four types of signals, '00', '01', '10', and '11', may be generated as data symbols because a 2-bit signal can be transmitted at a time.

As one example, because a 2-bit DBI-Flag signal can be transmitted if the auxiliary signal is transmitted in a PAM 4 signal, the DBI-Flag signal may include information on an encoded signal using only the DBI-DC encoding method, an encoded signal using only the DBI-AC encoding method, or a signal using both the DBI-DC encoding method and the DBI-AC encoding method.

Meanwhile, although for the convenience of description, the data encoding unit 120 and the auxiliary signal generation unit 130 are shown and described as separate components in FIG. 1, this is for the convenience of description, and the data encoding unit 120 may be implemented so as to perform the role played by the auxiliary signal generation unit 130 at the same time according to other embodiments.

The load unit 140 includes a plurality of loads, and the connection form of the loads in the load unit 140 varies depending on the data transmitted via the channel 170.

As one example, in the case that there are two loads connected to the channel and the data are transmitted in the NRZ method, since the data symbols are '0' and '1', if the data symbol of the input data is 0 according to the POD (pseudo-open drain) termination, the load connected to the ground is connected to the channel and thus, current flows through the channel from the voltage VDD to the ground GND.

Conversely, if the data symbol is 1, the load connected not to the ground but to the applied voltage is connected to the channel, and thus, no current flows and no power is consumed.

Accordingly, since the data inversion circuit 100 has a characteristic that power is consumed in the load unit when the data symbol is 1 and power is not consumed in the load unit when the data symbol is 0, the DBI-encoding may use this characteristic to perform encoding. In other words, the data symbol of the inputted data is analyzed, and if the number of 1's is less than the number of 0's based on a certain number, the data are inverted to cause the number of 1's to be greater than the number of 0's, and the power consumed in the entire circuit can be made smaller, thereby reducing power consumption. And, the encoding method according to such a method may be referred to as a DBI-DC encoding method or a first encoding method in the present disclosure.

On the other hand, if the encoding based on the PAM 4 signal is performed on the inputted data according to the embodiment of the data encoding unit 120, the data symbols are generated as a total of four types of signals, '00', '01', '10', and '11', as discussed above in the case of the PAM 4 signal, and thus, the connection form of the loads connected to the channel according to each signal may be formed differently from the case of the NRZ signal.

As one example, the load unit 140 may include four loads M1, M2, M3, and M4, as shown in FIG. 2, and for the four loads, the connection form of the loads connected to the channel 170 may be changed according to an on/off method for switches S1 and S2 of a control unit 150. FIG. 2 merely shows two switches as one example, and the number of switches of the present disclosure is not limited to two.

Looking into a connection form in which the loads of the load unit 140 are connected to the channel 170 according to the type of data symbol with reference to FIG. 3, there will be a structure in which only the first load M1 and the third load M3 are connected to the channel 170 under the control of the control unit 150 as shown in FIG. 3 (*a*) when the data symbol is '00'. And in this case, since the total load value is equal to (M1//M3)+M0, the total power consumption is equal to $(Vdd^{\wedge 2})/((M1//M3)+M0)$.

If M0 is 50 ohms, M1 is 150 ohms, and M3 is 75 ohms in FIG. 3 (*a*), the total resistance is equal to 100 ohms, and the power consumed when the data symbol is 00 will be referred to as first power consumption for the convenience of the description below.

There will be a structure in which only the second load M2 and the third load M3 are connected to the channel 170 under the control of the control unit 150 as shown in FIG. 3 (*b*) when the data symbol is '01'. And in this case, since the total load value is equal to (M0//M2)+M3, the total power consumption is equal to $(Vdd^{\wedge 2})/((M0//M2)+M3)$.

If M0 is 50 ohms, M2 is 150 ohms, and M3 is 75 ohms in FIG. 3 (*b*), the total resistance is equal to 112.5 ohms, and the power consumed when the data symbol is 01 will be referred to as second power consumption for the convenience of the description below.

There will be a structure in which only the first load M1 and the fourth load M4 are connected to the channel 170 under the control of the control unit 150 as shown in FIG. 4 (*a*) when the data symbol is '10'. And in this case, since the total load value is equal to (M0//M4)+M1, the total power consumption is equal to $(Vdd^{\wedge 2})/((M0//M4)+M1)$.

If M0 is 50 ohms, M1 is 150 ohms, and M4 is 75 ohms in FIG. 4 (*a*), the total resistance is equal to 180 ohms, and the power consumed when the data symbol is 10 will be referred to as third power consumption for the convenience of the description below.

There will be a structure in which only the second load M2 and the fourth load M4 are connected to the channel 170 under the control of the control unit 150 as shown in FIG. 4 (*b*) when the data symbol is '11'. And in this case, the total load value is equal to (M0//M2//M4), but since none of the loads takes the structure of being connected to the ground, there is no voltage difference and no current flows. Therefore, in this case, the total power consumption is equal to zero. The power consumed when the data symbol is 11 will be referred to as fourth power consumption for the convenience of the description below.

In other words, since the power consumption according to the data symbol is highest when the data symbol is 00 and the power is consumed less in the order of 01, 10, and 11, the data inversion circuit 100 in accordance with the present disclosure can enhance the power efficiency of the entire circuit by analyzing the arrangement and form of the data symbol for the inputted data, and performing encoding of inverting the data if it is decided that inverting and transmitting the data consumes less power. Hereinafter, a data encoding method will be discussed in detail.

FIG. 5 is a diagram showing inputted data, reference values and auxiliary signals according to them, and data encoded according to the type of the auxiliary signals in order to describe a first encoding method in accordance with the present disclosure.

The first encoding method in accordance with the present disclosure refers to a method of performing encoding by the data encoding unit 120 on the inputted data based on the auxiliary signal generated by the auxiliary signal generation unit 130 if the inputted data are data based on a PAM 4 signal but the auxiliary signal serving as a reference for encoding is an NRZ signal.

Since there are only two data symbols of 0 and 1 for the data if the data are based on an NRZ signal but there are a total of four data symbols of '00', '01', '10', and '11' in the case of a PAM 4 signal, the power consumption of the entire circuit may be rather increased if the DBI encoding is performed according to the PAM 2 signal. Therefore, when designing an auxiliary signal including information on an encoding method, in other words, the DBI-DC flag, as an NRZ signal (0 or 1), a reference equation is needed to determine based on what reference the design is to be carried out.

In order to determine the reference equation serving as a reference of whether to invert the data, how the power consumption occurs in the data transmission unit 160 for each data symbol in the PAM 4 signal is calculated as analyzed in FIGS. 3 and 4, and then the power consumption of the entire circuit before inverting the data is compared with the power consumption of the entire circuit after inverting the data.

If the power consumption when the data are inverted is smaller than the power consumption before the inversion, the data are inverted, and if the power consumption when the data are inverted is greater than the power consumption after the inversion, the inputted data are transmitted as they are without inverting the data.

To express this using an equation, let the number of '00' be x, the number of '01' be y, the number of '10' be z, and the number of '11' be w by analyzing the data symbols for the inputted data, then the circuit power consumption W1 when data are not inverted can be defined by Equation (1) below:

Equation (1): W1=first power consumption*x+second power consumption*y+third power consumption*z+the fourth power consumption*w And as one $$\frac{1}{100}x + \frac{1}{112.5}y + \frac{1}{180}z + 0 \cdot w$$

example, if M0 is 50 ohms, M2 is 150 ohms, M3 is 75 ohms, M4 is 75 ohms, and the input voltage Vdd is 1 V, Equation (1) can be expressed as Equation (2) below:
Equation (2):

Conversely, the circuit power consumption W2 in the case of the inversion for the inputted data (if 0 is inverted to 1 and 1 is inverted to 0) can be expressed as Equation (2) below:

Equation (3): W2=first power consumption*x+second power consumption*y+third power $$\frac{1}{100}w + \frac{1}{112.5}z + \frac{1}{180}y + 0 \cdot x$$

consumption*z+fourth power consumption*w

And as one example, if M0 is 50 ohms, M2 is 150 ohms, M3 is 75 ohms, M4 is 75 ohms, and the input voltage Vdd is 1 V, Equation (1) can be expressed as Equation (3) below:
Equation (4):

In other words, the data encoding unit 120 compares W1 and W2, and if W1 is larger, the data are inverted and transmitted as it is more power efficient to invert and transmit the data, and if W1 is smaller, the data are transmitted as they are without converting them as it is more power efficient to transmit the data as they are without inverting them.

And to express this differently, as the equation $3x+y-z-3w \geq 0$ serving as a reference for data inversion refers to a case where W1, the power consumption before inversion, is greater than W2, the power consumption after the inversion, rearranging Equations (2) and (4) causes the reference equation serving as the inversion to be arranged as in Equation (5) below, and the value calculated according to Equation (5) can be referred to as a reference value.
Equation (5):

In other words, the data encoding unit 120 calculates the number of each of the data symbols and then determines whether or not Equation (5) is satisfied, and if satisfied, the input data are inverted and transmitted, and otherwise, the input data are transmitted as they are without inversion.

As one example, if describe based on the input data shown in FIG. 5, in the case that the input data that come in first are 00/00/00/00, the number of 00 is four (4) and the numbers of the rest are zero (0), and thus, $x=4$, $y=0$, $z=0$, $w=0$, and plugging this into Equation (5) results in a reference value of 12. Therefore, the auxiliary signal generation unit 130 generates and transmits an auxiliary signal '1' instructing to encode data to the data encoding unit 120, and the data encoding unit 120 that has received the auxiliary signal value as 1 inverts the input data to generate 11/11/11/11, and then transmits the generated encoded data to the transmission unit.

Conversely, in the case that the input data that come in sixth are 00/01/11/11, the number of 00's is one (1), the number of 01's is one (1), and the number of 11's is three (3), and thus, $x=1$, $y=1$, $z=0$, $w=2$, and plugging this into Equation (5) results in a reference value of −2. Therefore, the auxiliary signal generation unit 130 generates and transmits an auxiliary signal '0' instructing to transmit the input data as they are without encoding the data to the data encoding unit 120.

In the case of the first encoding method, the input data are data based on the PAM 4 signal, but since the auxiliary signal corresponds to the NRZ signal, only signals of 0 or 1 can be generated. Therefore, the data encoding unit 120 inverts and encodes the input data and transmits the encoded data when it receives a signal of 0 from the auxiliary signal generation unit 130, and transmits the input data as they are without inverting them when it receives a signal of 1.

Meanwhile, the first encoding method is a method based on the premise that the auxiliary signal is generated as an NRZ signal, and as another embodiment of the present disclosure, the auxiliary signal may be generated as a PAM 4 signal, and encoding may be performed based on this.

In the case of implementing the auxiliary signal as a PAM 4 signal, the auxiliary signal is generated as a 2-bit signal unlike the NRZ signal, and thus, a weight different from the weight of the first encoding is applied, and since the data symbol 11 consumes the least power (consumes practically no power) as described earlier, the second encoding method refers to a method of exchanging the data symbol that takes up the highest proportion of the input data with the data symbol 11.

For example, if the number of 00's is four (4) and the number of 11's is one (1) among the data symbols, the second encoding may be performed by a method of setting the auxiliary signal to '00', changing the number of data symbols 00 to one, and changing the number of data symbols 11 to four. In other words, there is an advantage of being able to reduce the power consumption of the entire circuit by determining the number of each type of data symbol and replacing the data symbol having the highest proportion with the data symbol 11 having the lowest use of power.

So far, the first encoding and the second encoding, which can reduce the power consumption of the entire circuit, have been discussed. In the following, the crosstalk phenomenon that may occur in the data inversion circuit will be described through the drawings, and a method that can reduce the crosstalk phenomenon will be discussed in detail.

Figures 6A, 6B:
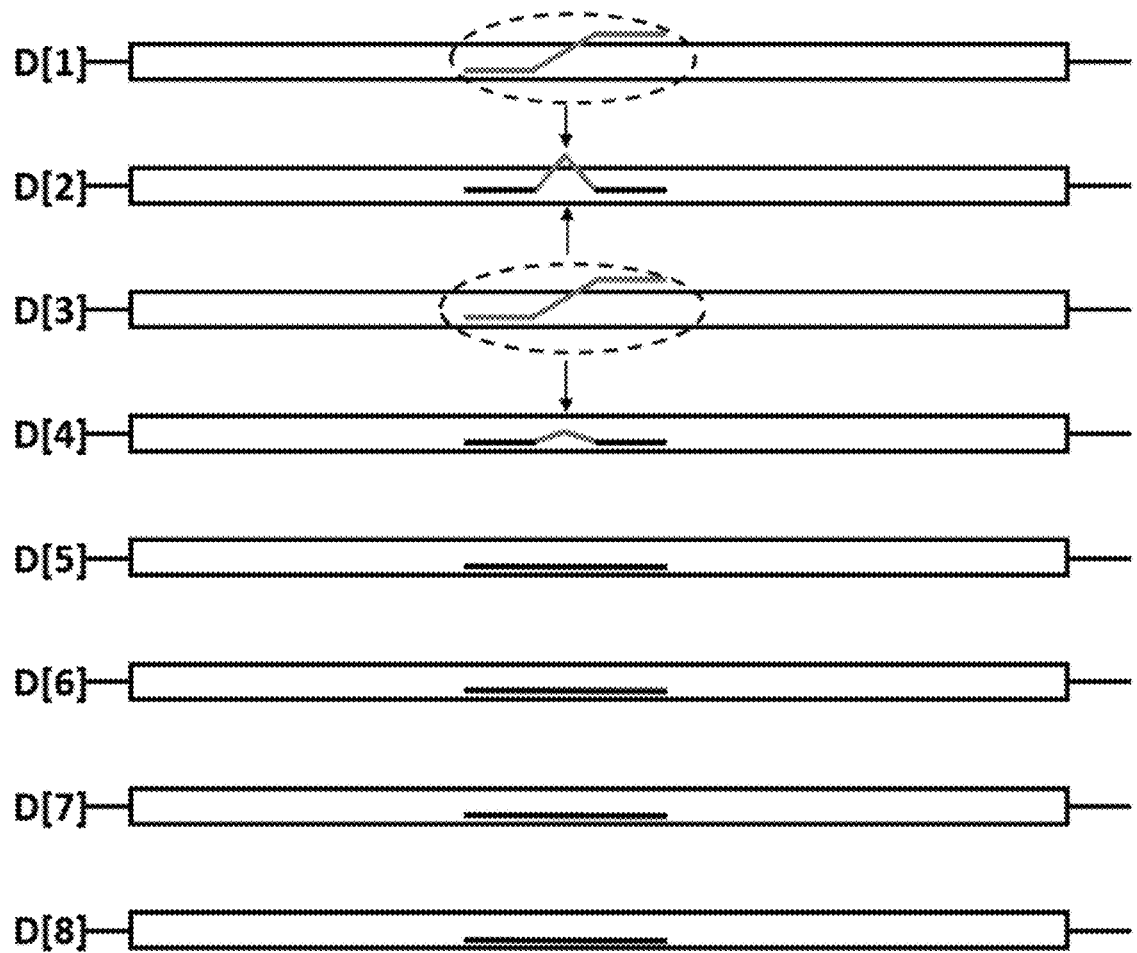
FIGS. 6(a) and 6(b) are diagrams for describing a crosstalk phenomenon that may occur in a data transmission process.

FIGS. 6(*a*) and 6(*b*) is a diagram for describing a crosstalk phenomenon that may occur in a data transmission process, and FIG. 6 (*a*) is a table showing data symbols inputted to eight (8) data lines at time T0 and time T1 and FIG. 6 (*b*) is a diagram for describing a crosstalk phenomenon that a second data line and a fourth data line create.

A crosstalk phenomenon is a phenomenon in which signals on different transmission lines affect other lines by electrical coupling such as inductive coupling, a crosstalk phenomenon is a direct cause for deteriorating communication quality, and such a crosstalk phenomenon frequently occurs if there are changes in the data transmitted on any one data line when data are transmitted through a plurality of data lines.

This will be described through FIG. 6, and while the channel contains eight (8) data lines D1 to D8 and if signals all of which are 0 are inputted to eight (8) data lines at a particular time T0 and a signal of 1 is inputted to the first data line D1 and the third data line D3 at time T1 as shown in FIG. 6 (*a*), a change in the magnitude of a signal occurs in the first data line D1 and the third data line D3 as shown in FIG. 6 (*b*).

Accordingly, a crosstalk phenomenon occurs in other adjacent data lines due to electrical coupling such as inductive coupling when there is a change in the magnitude of a signal in a particular data line in this way. In other words, as shown in the figure, a crosstalk phenomenon occurs in the second data line D2 due to signal changes in the first data line D1 and the third data line D3, a crosstalk phenomenon occurs in the fourth data line D4 due to a signal change in the third data line D3, and as the second data line D2 is affected by the signal changes of the data lines on both sides unlike the fourth data line D4, a crosstalk phenomenon greater than that of the fourth data line D4 occurs.

Therefore, it is necessary to ensure that there is no change in the signals in the data lines in order to suppress the crosstalk phenomenon, but since it is not possible to transmit data so that the signal change itself does not occur in transmitting the data, minimizing the number of lines in which the crosstalk phenomenon occurs in a plurality of data lines included in the channel can reduce problems caused by the crosstalk phenomenon.

Specifically, looking into this closely, in the case that the number of data symbols changing from '0' to '1' exceeds the majority through the comparison of the data to be transmitted now with the data transmitted previously, if the values of the data to be transmitted now are inverted and transmitted, the number of data symbols changing from 0 to 1 does not exceed the majority, and thus, the number of crosstalk occurring in the entire data line can be reduced.

For example, in the case that there is a change in the data symbol in the five data lines and no change in the data symbol in the three data lines out of eight data lines based on the data to be transmitted now, if the data to be transmitted now are inverted and transmitted, the change in the data symbol occur only on the three data lines and no change in the data symbol occur on the five data lines, and thus, the number of data lines in which the crosstalk occurs in the entire circuit can be reduced from five to three.

Conversely, in the case that there is a change in the data symbol in the three data lines and no change in the data symbol in the five data lines out of eight data lines based on the data to be transmitted now, if the data to be transmitted now are inverted and transmitted, a crosstalk phenomenon occurs rather on the five data lines, and thus, the number of data lines on which the crosstalk phenomenon occurs is greater than the case where the data are inverted and transmitted, and accordingly, the data can be transmitted as they are without inverting them in such a case. As a change in the data symbol occurs and there is no change in the data symbol in the five data lines, it is possible to prevent the crosstalk phenomenon in the entire circuit from occurring.

Therefore, the data encoding unit 120 in accordance with the present disclosure may perform a third encoding on the input data through this method, and as the input data in accordance with the present disclosure are data based on the PAM 4 signal, a reference is set for the change of the data symbol according to the PAM 4 signal, and encoding may then be performed according to the reference.

Specifically, there are a total of four data symbols such as 00, 01, 10, and 11 in the case of the PAM 4 signal, and as the number increases, the level corresponding to the magnitude of voltage corresponding to the data symbol increases. For example, if 00 corresponds to 0 V and 11 corresponds to X V, then 01 corresponds to ⅓ V and 10 corresponds to ⅔ V. That is, as the data symbols increase one by one from 00, the level of data is evenly increased by one level.

Therefore, if a change in the data symbol occurs over time in transmitting data, a change in the level of the voltage by that amount occurs, and the more such changes occur, the greater the crosstalk phenomenon occurring in the entire data line. Accordingly, if it is decided whether to invert the input data based on these characteristics, data can be encoded more efficiently. In the following, a detailed discussion will be made with reference to the drawings.

Figure 8:
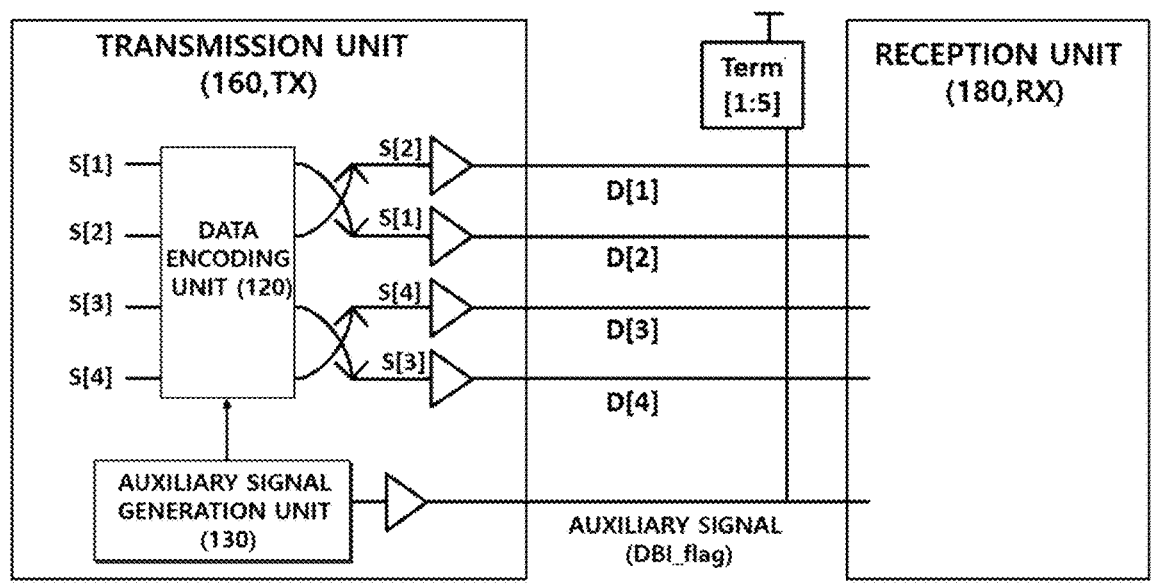
FIG. 8 is a diagram for describing a third encoding method of a data encoding unit according to one embodiment of the present disclosure, which is a case where it is assumed that there are four data lines in a channel, and a change in the level of a data symbol is defined as a stack value.

FIGS. 7(*a*) and 7(*b*) is a figure for describing a reference to which a third encoding method in accordance with one embodiment of the present disclosure is applied, and FIG. 8 is a diagram for describing a third encoding method of a data encoding unit according to one embodiment of the present disclosure, which is a case where it is assumed that there are four data lines in a channel, and a change in the level of a data symbol is defined as a stack value. Therefore, if there is a change in the data symbol either up or down by 1 level, the stack value is equal to 1, and if there is a change in the data symbol either up or down by two levels, the stack value is equal to 2.

The data encoding unit 120 may determine whether to perform the third encoding based on the change in the level of the total data symbols occurring in the data line as described above, which may be decided based on the total number of data lines and the stack value calculated for each data line.

Specifically, the data encoding unit 120 calculates the maximum stack value that can occur in correspondence to the number of data lines, and then calculates a summed value of all the stack values based on the current input data and the previous input data for each data line, and performs encoding on the input data and then transmits them if the summed stack value is greater than ½ of the maximum stack value, and transmits the data as they are without encoding them if the summed stack value is less than or equal to ½ of the maximum stack value.

As one example, if described based on the table of FIG. 7, there are a total of four data lines and the change in the maximum stack value that can occur in one data line is three, and thus, the maximum number of stacks that can occur in a total of four data lines is 12.

And, as set forth in FIG. 7 (*a*), in the case that the data to be transmitted based on the current time T1 are 11 for the first data line D1, 01 for the second data line D2, 01 for the third data line D3, and 11 for the fourth data line D4, and the data transmitted at T0, which is a time one time before the current time, are 10 for the first data line D1, 11 for the second data line D2, 11 for the third data line D3, and 00 for the fourth data line D4, if the change level of the data symbol that occurs in each data line is calculated, the stack value is equal to 1 for the case of the first data line D1 as a change of a total of one level occurs, and the stack value is equal to 2 for the second data line D2 as a change of a total of two levels occurs. And the stack value is equal to 2 for the case of the third data line D3 as a change of a total of 2 levels occurs, and the stack value is equal to 3 for the case of the fourth data line D4 as a change of a total of 3 levels occurs. Accordingly, the sum of the stack values in all the data lines is equal to 8, which exceeds 6, which is half of the maximum stack value of 12, and thus, the data are inverted at this time.

On the other hand, as set forth in FIG. 7 (*b*), in the case that the data to be transmitted based on the current time T1 are 11 for the first data line D1, 01 for the second data line D2, 01 for the third data line D3, and 11 for the fourth data line D4, and the data transmitted at T0, which is a time one time before the current time, are 10 for the first data line D1, 01 for the second data line D2, 10 for the third data line D3, and 10 for the fourth data line D4, if the change level of the data symbol that occurs in each data line is calculated, the stack value is equal to 1 for the case of the first data line D1 as a change of a total of one level occurs, and the stack value is equal to 0 for the second data line D2 as a change of a total of zero levels occurs. And the stack value is equal to 2 for the case of the third data line D3 as a change of a total of 2 levels occurs, and the stack value is equal to 4 for the case of the fourth data line D4 as a change of a total of 1 level occurs.

Therefore, the sum of the stack values in all the data lines is 4, which is less than or equal to 6, which is half of the maximum stack value of 12, and accordingly, since inverting the data would rather increase the maximum stack value and rather cause the crosstalk phenomenon to be larger in such a case, the data encoding unit 120 transmits the data as they are without inverting them at this time.

Meanwhile, the calculation of such stack values may be performed by the data encoding unit 120 or by the auxiliary signal generation unit 130. If the auxiliary signal generation unit 130 generates an auxiliary signal for the third encoding, the auxiliary signal may be transmitted as an NRZ signal.

Therefore, the auxiliary signal generation unit 130 generates an auxiliary signal 1 that requires encoding and transmits the generated auxiliary signal to the data encoding unit 120 if it determines that it is a case requiring encoding according to the stack value calculation result, and generates an auxiliary signal 0 that does not require encoding and transmits the generated auxiliary signal to the data encoding unit 120 if it is determined that encoding is unnecessary.

On the other hand, when performing the third encoding of inverting the data in order to suppress the crosstalk phenomenon, the data encoding unit 120 encodes a method of changing the data symbols in the Nth data line and the (N+1)th data line without inverting the data (0 to 1, 1 to 0) according to the first encoding method.

That is, if the data encoding unit 120 determines that the third encoding needs to be performed, the data encoding unit 120 may perform encoding on the input data in the method of exchanging the data symbols of a first data line D1 and a second data line D2 and exchanging the data symbols of a third data line D3 and a fourth data line D4, as shown in FIG. 8. In other words, the encoding is performed in the method of inputting a first data symbol S1 of the input data into the second data line D2, inputting a second data symbol S2 into the first data line D1, inputting a third data symbol S3 into the fourth data line D4, and inputting a fourth data symbol S4 into the third data line D3.

Therefore, when 8, which is the sum of the total stack values, exceeds 6, which is half of the maximum stack value as in FIG. 7 (*a*), the data encoding unit 120 performs the third encoding in an encoding method, and the encoded data to be transmitted at time T1 are 01 for the first data line D1, 11 for the second data line D2, 11 for the third data line D3, and 01 for the fourth data line D4, as shown in the table. And if the data are transmitted after encoding in this way, the total stack value is equal to 2 as described in the rightmost item of FIG. 7 (*a*), which is smaller than the previous total stack value of 8, and thus, there is an advantage of being able to reduce the crosstalk phenomenon occurring in the circuit.

The reason that the third encoding method encodes in a method different from the first encoding method and the second encoding method is that the first encoding and the second encoding have the purpose of reducing power consumption, whereas the third encoding corresponds to an encoding method whose purpose is to suppress the crosstalk phenomenon. Therefore, if the first encoding method or the second encoding method is applied as an encoding method for preventing the crosstalk phenomenon, power consumption may rather increase. However, if data are encoded in the third encoding method, the value of the entire data itself does not change but only the location where the data are transmitted changes, and thus, the difference in the change of the data symbols is small while there is no change in power consumption, resulting in an effect of being able to effectively suppress the crosstalk phenomenon.

On the other hand, such an encoding method can be applied by the same principle even when the channel has eight data lines instead of four. A detailed discussion will be provided through the drawings below.

Figure 10:
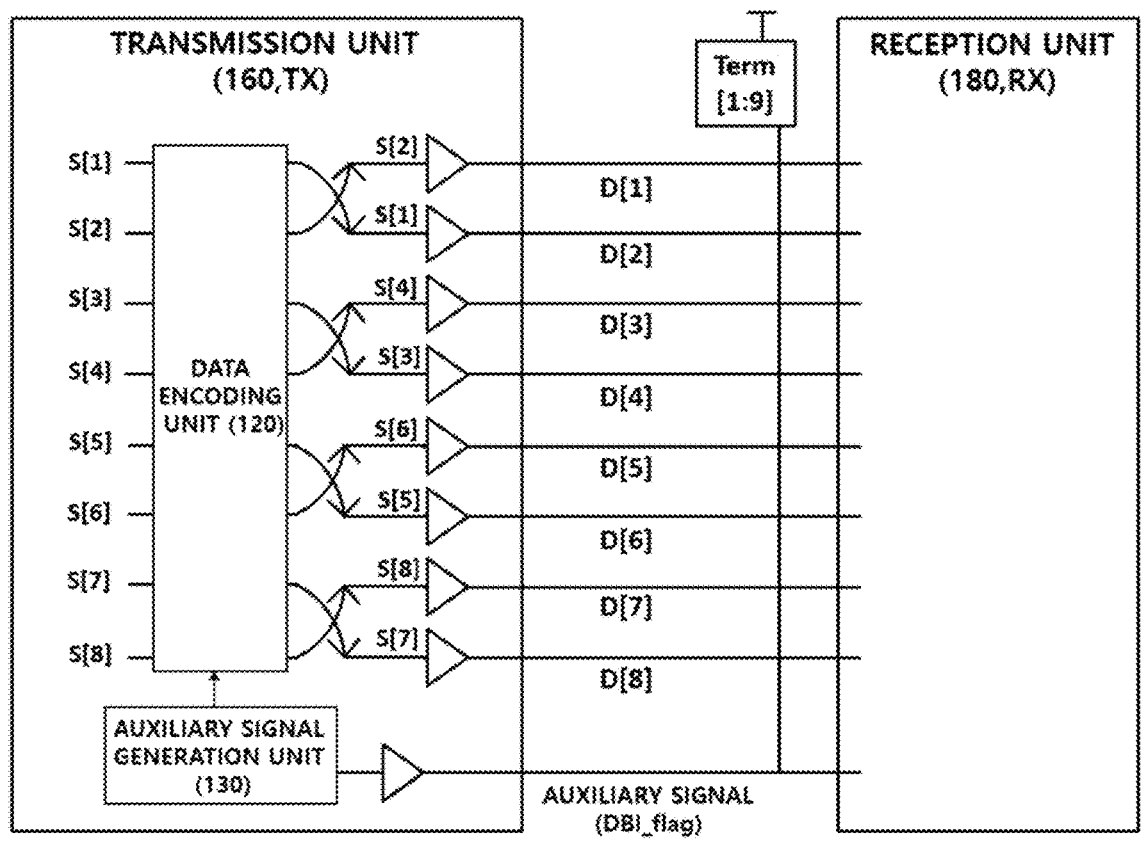
FIG. 10 is a diagram for describing a method in which a third encoding method is applied to eight data lines according to one embodiment of the present disclosure.

FIGS. 9(*a*) and 9(*b*) is a figure for describing a reference on which a third encoding method in accordance with one embodiment of the present disclosure is applied to eight data lines, and FIG. 10 is a diagram for describing a method in which a third encoding method is applied to eight data lines according to one embodiment of the present disclosure.

The data encoding unit 120 may determine whether to perform the third encoding based on the change in the level of the total data symbols occurring in the data line as described above, which may be decided based on the total number of data lines and the stack value calculated for each data line.

Specifically, the data encoding unit 120 calculates the maximum stack value that can occur in correspondence to the number of data lines, and then calculates a summed stack value of all the stack values based on the current input data and the previous input data for each data line, and inverts and then transmits the data if the stack value is greater than ½ of the maximum stack value, and transmits the data as they are without inverting them if the stack value is less than or equal to ½ of the maximum stack value.

If described based on the table of FIG. 9, there are a total of eight data lines and the change in the maximum stack value that can occur in one data line is three, and thus, the maximum number of stacks that can occur in a total of eight data lines is 24.

And, as set forth in FIG. 7 (*a*), in the case that the data to be transmitted based on the current time T1 are 01 for the first data line D1, 11 for the second data line D2, 01 for the third data line D3, 11 for the fourth data line D4, 01 for the fifth data line D5, 11 for the sixth data line D6, 11 for the seventh data line D7, and 01 for the eighth data line D8, and the data transmitted at T0, which is a time one time before the current time, are 11 for the first data line D1, 01 for the second data line D2, 10 for the third data line D3, 01 for the fourth data line D4, 00 for the fifth data line D5, 01 for the sixth data line D6, 10 for the seventh data line D7, and 11 for the eighth data line D8, if the change level of the data symbol that occurs in each data line is calculated, the stack value is equal to 3 for the case of the first data line D1 as a change of a total of one level occurs, and the stack value is equal to 2 for the second data line D2 as a change of a total of two levels occurs. And if the stack values are calculated for all the data lines in this way, the sum of the stack values for the current input data is equal to 14, which is more than half of the maximum stack value of 24 for the eight data lines, and thus, the data are encoded at this time.

Meanwhile, as a result of calculating the stack values for the input data inputted at the current time T0 described in FIG. 9 (*b*) with the input data transmitted at the time T0, if the sum of the stack values is equal to 7, which is less than half of the maximum stack value (24), the input data are transmitted as they are without encoding. Although the expression of encoded data was used in FIG. 9 (*b*) so as to correspond to the table in FIG. 9 (*a*), the encoded data determined not to be encoded correspond to data having substantially the same values as the input data.

Meanwhile, the calculation of such stack values may be performed by the data encoding unit 120 or by the auxiliary signal generation unit 130. If the auxiliary signal generation unit 130 generates an auxiliary signal for the third encoding, the auxiliary signal may be transmitted as an NRZ signal.

Therefore, the auxiliary signal generation unit 130 generates an auxiliary signal of 0 that requires encoding and transmits the generated auxiliary signal to the data encoding unit 120 if it determines that it is a case requiring encoding according to the stack value calculation result, and generates an auxiliary signal of 1 that does not require encoding and transmits the generated auxiliary signal to the data encoding unit 120 if it is determined that encoding is unnecessary.

On the other hand, when performing the third encoding of inverting the data in order to suppress the crosstalk phenomenon, encoding a method of changing the data symbols in the Nth data line and the (N+1)th data line is performed, as described with reference to FIGS. 7 and 8.

That is, if it is determined that the third encoding needs to be performed, the data encoding unit 120 may perform encoding on the input data in the method of exchanging the data symbols of a first data line D1 and a second data line D2, exchanging the data symbols of a third data line D3 and a fourth data line D4, exchanging the data symbols of a fifth data line D5 and a sixth data line D6, and exchanging the data symbols of a seventh data line D7 and an eighth data line D8, as shown in FIG. 10.

Therefore, when the sum (14) of the total stack values exceeds half (12) of the maximum stack value as in FIG. 9 (*a*), the data encoding unit 120 performs encoding on the input data in the third encoding method, and the encoded data to be transmitted at time T1 are 11 for the first data line D1, 00 for the second data line D2, 11 for the third data line D3, 01 for the fourth data line D4, 11 for the fifth data line D5, 01 for the sixth data line D6, 01 for the seventh data line D7, and 11 for the eighth data line D8, as shown in the table. And if the data are transmitted after encoding in this way, the total stack value is equal to 6 as described in the rightmost item of FIG. 9 (a), which is smaller than the previous total stack value of 14, and thus, there is an advantage of being able to reduce the crosstalk phenomenon occurring in the circuit.

Figure 11:
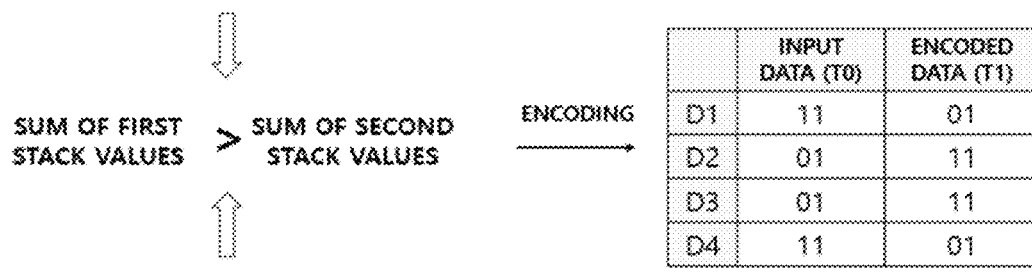
FIG. 11 is a figure for describing another embodiment to which a third encoding in accordance with one embodiment of the present disclosure is applied.
Figure 12:
FIG. 12 is a figure for describing a method in which the third encoding according to FIG. 11 is applied to eight data lines.

FIG. 11 is a figure for describing another embodiment to which a third encoding in accordance with one embodiment of the present disclosure is applied, and FIG. 12 is a figure for describing a method in which the third encoding according to FIG. 11 is applied to eight data lines.

In the case of the third encoding method according to FIG. 11, the method of performing encoding on the input data is the same as described in FIG. 9, but a reference for determining whether to encode is different from the method of FIG. 9 in which the determination is made based on the absolute value of the stack value, and the determination of whether to encode is made based on the stack value of the input data before conversion and the stack value of the encoded data. For the convenience of description, a stack value for input data is defined as a first stack value, data under the assumption that a third encoding has been performed on the input data is defined as converted data, and a stack value for the converted data is defined as a second stack value, in FIG. 11.

In a specific discussion for the third encoding method according to FIG. 11, the sum of the first stack values is obtained by comparing the input data for the current time T1 and the input data for the previous time T0, as described in the table of FIG. 11 located at the top of the sheet. And the sum of the second stack values is obtained by comparing the converted data under the assumption that encoding has been performed on the current input data and the input data for the previous time T0 as shown in FIG. 11 located at the bottom of the sheet, and then, if the sum of the first stack values is greater than the sum of the second stack values, it may be determined to actually perform encoding on the input data.

In other words, the sum of the first stack values is equal to 8 in the case of FIG. 11 located at the top of the sheet, and if the input data are converted to generate converted data, 01 is inputted to the first data line D1, 11 is inputted to the second data line D2, 11 is inputted to the third data line D3, and the 00 is inputted to the 4 data line D4, as described in FIG. 12 located at the bottom of the sheet, and thus, the sum of the second stack values is equal to 2. Therefore, in such a case, the encoding is performed on the input data as the crosstalk phenomenon gets smaller in the case where the input data are encoded and then transmitted than otherwise.

That is, the total value of the stack values means the degree to which the crosstalk phenomenon occurs in the whole data lines, and the sum of the first stack values and the sum of the second stack values are compared in the same way as the third encoding, and in the case that the second stack value is less than the first stack value, if the input data are converted and then the data are transmitted, the magnitude of the stack value of the transmitted data gets smaller, and thus, there is an effect that the crosstalk phenomenon occurs relatively less.

Meanwhile, the calculation and comparison of such stack values may be performed by the data encoding unit 120 or by the auxiliary signal generation unit 130. If the auxiliary signal generation unit 130 generates an auxiliary signal for the third encoding, the auxiliary signal may be transmitted as an NRZ signal.

Therefore, the auxiliary signal generation unit 130 generates an auxiliary signal of 0 that requires encoding and transmits the generated auxiliary signal to the data encoding unit 120 if it determines that it is a case requiring encoding according to the stack value calculation result, and generates an auxiliary signal of 1 that does not require encoding and transmits the generated auxiliary signal to the data encoding unit 120 if it is determined that encoding is unnecessary.

On the other hand, such an encoding method can be applied by the same principle even when the channel has eight data lines instead of four. That is, the sum of the first stack values is obtained by comparing the input data for the current time T1 and the input data for the previous time T0, as described in the table of FIG. 12 located at the top of the sheet, and the sum of the second stack values for the converted data under the assumption that encoding has been performed on the current input data is obtained, as described in the table of FIG. 12 located at the bottom of the sheet, and then, if the sum of the first stack values is greater than the sum of the second stack values, it may be determined to actually perform encoding on the input data.

If the sum of the first stack values is less than the sum of the second stack values, unlike what is described in FIG. 12, this is the case where the crosstalk phenomenon occurs less when the input data are transmitted as they are without converting them, and thus, the input data are transmitted as encoded data without conversion in such a case.

Figure 13:
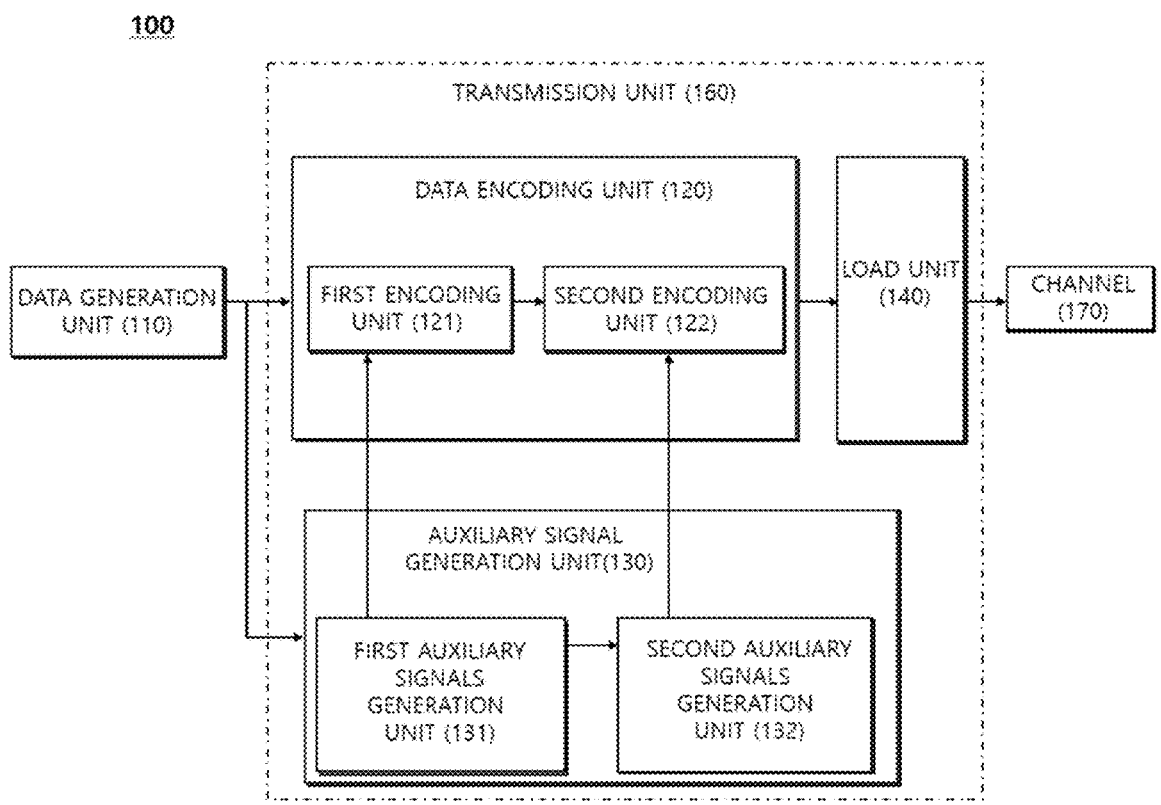
FIG. 13 is a block diagram showing some components of a data inversion circuit that is another embodiment of the present disclosure.

FIG. 13 is a block diagram showing some components of a data inversion circuit that is another embodiment of the present disclosure, and FIG. 14 is a table for describing a fourth encoding in accordance with one embodiment of the present disclosure. The fourth encoding described in FIGS. 13 and 14 refers to an encoding method in which the first encoding and the third encoding are sequentially applied.

Referring to FIG. 13, the data inversion circuit 100 in accordance with another embodiment may include a data generation unit 110 configured to generate data, a data transmission unit 160 configured to transmit the generated data via a channel, a channel 170 corresponding to a travel path of data, and a data reception unit 180 configured to receive data, the data transmission unit 160 may include a data encoding unit 120, an auxiliary signal generation unit 130, and a load unit 140, the data encoding unit 120 may include a first encoding unit 121 and a second encoding unit 122, and the auxiliary signal generation unit 130 may include a first auxiliary signal generation unit 131 and a second auxiliary signal generation unit 132. That is, the data inversion circuit 100 according to FIG. 13 has the same basic components as the data inversion circuit 100 described in FIG. 1, but there is a difference in that the data encoding unit 120 may include the first encoding unit 121 and the second encoding unit 122, and the auxiliary signal generation unit 130 may include the first auxiliary signal generation unit 131 and the second auxiliary signal generation unit 132. For the convenience of duplication of the description below, the data generation unit 110, the load unit 140, and the channel 170 will be replaced by what is described above with reference to FIG. 1.

The data encoding unit 120 may include a first encoding unit 121 that primarily performs encoding on the input data, and a second encoding unit 122 that generates encoded data that performs secondary encoding on the intermediate data generated by the first encoding unit 121.

Specifically, the first encoding unit 121 is a component that performs the first encoding described above and may be referred to as a DBI-DC encoding unit according to its role, and the second encoding unit 122 is a component that performs the third encoding described above and may be referred to as a DBI-Cross encoding unit according to its role. In accordance with this, the first auxiliary signal generation unit 131 is a component that generates a first auxiliary signal that determines whether the first encoding unit 121 is to perform the first encoding, and the second auxiliary signal generation unit 132 is a component that generates a second auxiliary signal that determines whether the second encoding unit 122 is to perform the second encoding. The method of performing the first encoding method and the third encoding have been described above, and thus, it will be discussed how the first encoding method and the third encoding method are sequentially applied based on FIG. 14.

When inputted as input data at time T1 as described in the table of FIG. 14, the first auxiliary signal generation unit 131 generates a first auxiliary signal for determining whether to perform the first encoding. As a decision is made based on Equation (5) in the case of the first encoding as described above, the reference value is equal to 6 as described in the table if calculated based on the input data, which is greater than 0, and thus, the first auxiliary signal generation unit 131 generates 1, which is a data symbol for performing the first encoding, as the first auxiliary signal, and transmits the generated first auxiliary signal to the first encoding unit 121.

The first encoding unit 121 that has received the first auxiliary signal, which is 1 as the data symbol, performs the first encoding on the input data of time T1 according to the first encoding method described above, and generates intermediate data of T1 time as described in the table.

After that, the second auxiliary signal generation unit 132 compares the intermediate data of the time T1 with the input data of the time T0 to thereby determine whether to perform the third encoding. Specifically, it is possible to determine whether to perform the third encoding according to the method described in FIG. 12, and by comparing a summed value of all the first stack values of the intermediate data of the current time T1 and the input data of the time T0, and a summed value of all the second stack values of the converted data of the time T1 generated by hypothetically performing the third encoding on the intermediate data of the time T1, it is determined whether to perform the third encoding.

If described based on the table of FIG. 14, a summed value of all the first stack values is equal to 10 and a summed value of all the second stack values is equal to 8, and thus, the second auxiliary signal generation unit 132 generates a second auxiliary signal, which is a data symbol of 1, so that the second encoding unit 122 can perform the third encoding, and then transmits the generated second auxiliary signal to the second encoding unit 122.

The second encoding unit 122 that has received the second auxiliary signal, which is the data symbol 1, performs encoding according to the third encoding method described above and generates final encoded data as described in the last right item of the table.

On the other hand, since the auxiliary signal may be generated as a PAM 4 signal, which is a signal of a total of 2 bits, as one is generated by the first auxiliary signal generation unit 131 and another is generated by the second auxiliary signal generation unit 132 in FIGS. 13 and 14, one signal configured with the PAM 4 signal may be transmitted from the auxiliary signal generation unit 130 to the encoding unit 120.

For example, if the auxiliary signal is 00, the first auxiliary signal is 0 and the second auxiliary signal is also 0, and thus, the encoding unit 120 performs neither the first encoding nor the third encoding, if the auxiliary signal is 01, the first auxiliary signal is 0 and the second auxiliary signal is 1, and thus, the encoding unit 120 does not perform the first encoding but performs the third encoding, and if the auxiliary signal is 10, the first auxiliary signal is 1 and the second auxiliary signal is 0, and thus, the encoding unit 120 performs the first encoding but not perform the third encoding. Finally, if the auxiliary signal is 11, the first auxiliary signal is 1 and the second auxiliary signal is also 1, and thus, the encoding unit 120 performs both the first encoding and the third encoding.

If data are encoded according to the fourth encoding in which the first encoding and the third encoding are sequentially applied as in the method described in FIGS. 13 and 14, there is a great advantage that the power consumption of the entire circuit can be reduced by performing the first encoding, and the crosstalk phenomenon of the entire circuit can also be suppressed simultaneously because the third encoding is also performed at the same time.

FIG. 15 is a table showing changes in power consumption between the case where each encoding method is applied and the case where each encoding method is not applied in order to describe the effect in accordance with the present disclosure.

Referring to FIG. 15, it can be confirmed that the data are transmitted using the first encoding method and only 82.77% of the power consumption is used as compared with the case where no encoding is performed at all for input data based on the PAM 4 signal, and it can be confirmed that the data are transmitted using the second encoding method and only 73.83% of the power consumption is used as compared with the case where no encoding is performed at all for input data based on the PAM 4 signal.

In addition, it can be confirmed that the data are transmitted using the fourth encoding method and only 82.70% of the power consumption is used for DC and only 80.60% is used for AC as compared with the case where no encoding is performed at all for input data based on the PAM 4 signal. That is, it can be seen from the experimental results that any encoding method in accordance with the present disclosure has an effect of reducing power consumption over the prior art.

So far, a data inversion circuit to perform DBI-AC encoding using PAM 4 signal according to the embodiment have been described in detail.

On the other hand, the constitutional elements, units, modules, components, and the like stated as "~part or portion" in the present invention may be implemented together or individually as logic devices interoperable while being individual. Descriptions of different features of modules, units or the like are intended to emphasize functional embodiments different from each other and do not necessarily mean that the embodiments should be realized by individual hardware or software components. Rather, the functions related to one or more modules or units may be performed by individual hardware or software components or integrated in common or individual hardware or software components.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof.

The processes and logic flows described in this specification can be performed by one or more programmable processors executing one or more computer programs to perform functions by operating on input data and generating output.

This written description sets forth the best mode of the present invention and provides examples to describe the present invention and to enable a person of ordinary skill in the art to make and use the present invention. This written description does not limit the present invention to the specific terms set forth.

While the present invention has been shown and described with reference to certain embodiments thereof, it will be understood by those skilled in the art that various changes in forms and details may be made therein without departing from the spirit and scope of the present invention as defined by the appended claims and their equivalents. Therefore, the technical scope of the present invention may be determined by on the technical scope of the accompanying claims.

What is claimed is:

1. A data inversion circuit configured to perform alternating current data bus inversion (DBI-AC) encoding using a four-level pulse amplitude modulation (PAM 4) signal, the data inversion circuit comprising:
    a data generation unit configured to generate input data based on the PAM 4 signal;
    an auxiliary signal generation unit configured to generate an auxiliary signal that determines whether to perform encoding on the input data by analyzing the relationship between a plurality of data symbols at a current time point and a plurality of data symbols at a previous time point included in the input data;
    a channel comprising a plurality of data lines; and
    a data encoding unit configured to generate encoded data by performing data bus inversion (DBI) encoding on the input data based on the auxiliary signal and to transmit the generated encoded data to a data reception unit via the channel.

2. The data inversion circuit configured to perform the DBI-AC encoding using the PAM 4 signal of claim 1, wherein the auxiliary signal generation unit determines whether to perform encoding on the input data based on level difference values between the plurality of data symbols at the current time point and the plurality of data symbols at the previous time point respectively corresponding to the N plurality of data lines.

3. The data inversion circuit configured to perform the DBI-AC encoding using the PAM 4 signal of claim 2, wherein the auxiliary signal generation unit determines to perform encoding on the input data if a summed stack value of all of the level difference values between the plurality of data symbols at the current time point and a plurality of data symbols at a next time point respectively corresponding to the plurality of data lines exceeds a preset value, and determines not to perform encoding on the input data if it does not exceed the preset value.

4. The data inversion circuit configured to perform the DBI-AC encoding using the PAM 4 signal of claim 3, wherein the auxiliary signal generation unit:
    generates the auxiliary signal as a non-return to zero (NRZ) signal, and
    generates the auxiliary signal having a data symbol of 1 if determined to perform encoding on the input data, and generates the auxiliary signal having a data symbol of 0 if determined not to perform encoding on the input data.

5. A data inversion circuit configured to perform alternating current data bus inversion (DBI-AC) encoding using a four-level pulse amplitude modulation (PAM 4) signal, the data inversion circuit comprising:
    a data generation unit configured to generate input data based on the PAM 4 signal;
    a channel comprising a plurality of data lines;
    a first auxiliary signal generation unit configured to generate a first auxiliary signal that determines whether to perform a first encoding on the input data based on the number of each of a plurality of data symbols included in the input data;
    a first data encoding unit configured to generate intermediate data by performing the first encoding on the input data based on the first auxiliary signal;
    a second auxiliary signal generation unit configured to generate a second auxiliary signal that determines whether to perform a third encoding on the intermediate data by analyzing the relationship between a plurality of data symbols at a current time point and a plurality of data symbols at a previous time point included in the intermediate data; and
    a second data encoding unit configured to generate encoded data by performing the third encoding on the intermediate data based on the second auxiliary signal, and to transmit the generated encoded data to a data reception unit via the channel.

6. The data inversion circuit configured to perform the DBI-AC encoding using the PAM 4 signal of claim 5, wherein the first encoding is encoding of inverting data symbols having a data symbol of 1 to 0 and inverting data symbols having a data symbol of 0 to 1 among the input data.

7. A data inversion circuit configured to perform alternating current data bus inversion (DBI-AC) encoding using a four-level pulse amplitude modulation (PAM 4) signal, the data inversion circuit comprising:
    a data generation unit configured to generate input data based on the PAM 4 signal;
    a channel comprising a plurality of data lines;
    a first auxiliary signal generation unit configured to generate a first auxiliary signal that determines whether to perform a first encoding on the input data based on the number of each of a plurality of data symbols included in the input data;
    a first data encoding unit configured to generate intermediate data by performing the first encoding on the input data based on the first auxiliary signal;
    a second auxiliary signal generation unit configured to generate a second auxiliary signal that determines whether to perform a third encoding on the intermediate data by analyzing the relationship between a plurality of data symbols at a current time point and a plurality of data symbols at a previous time point included in the intermediate data; and
    a second data encoding unit configured to generate encoded data by performing the third encoding on the intermediate data based on the second auxiliary signal, and to transmit the generated encoded data to a data reception unit via the channel,
    wherein the first auxiliary signal and the second auxiliary signal are combined into one signal and implemented as the PAM 4 signal.

* * * * *